United States Patent
Jung

(10) Patent No.: US 7,380,160 B2
(45) Date of Patent: May 27, 2008

(54) APPARATUS FOR AND METHOD OF HANDLING FAILURE IN READING MOTION PICTURE DATA FROM STORAGE MEDIUM AND REPRODUCING THE SAME

(75) Inventor: Min-soo Jung, Suwon-Si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 621 days.

(21) Appl. No.: 10/912,226

(22) Filed: Aug. 6, 2004

(65) Prior Publication Data

US 2005/0034035 A1    Feb. 10, 2005

(30) Foreign Application Priority Data

Aug. 6, 2003    (KR)    ............ 10-2003-0054348

(51) Int. Cl.
  *G06F 11/00*    (2006.01)
(52) U.S. Cl. ............................ 714/8; 369/30.22
(58) Field of Classification Search ............... 714/5–9; 369/44.32, 44.33
  See application file for complete search history.

(56) References Cited

U.S. PATENT DOCUMENTS 6,690,882 B1 * 2/2004 Hanmann et al. ........... 386/125
6,999,386 B2 * 2/2006 Sugimoto et al. ........... 369/30.22

FOREIGN PATENT DOCUMENTS

| JP | 11-328686 | 11/1999 |
|---|---|---|
| JP | 11328686 A * | 11/1999 |
| JP | 2000-331344 | 11/2000 |
| JP | 2000331344 A * | 11/2000 |
| JP | 2002-170334 | 6/2002 |
| JP | 2002183972 A * | 6/2002 |
| JP | 2002-279766 | 9/2002 |
| KR | 1999-0084716 | 12/1999 |

OTHER PUBLICATIONS

Korean Office Action for Application No. 10-2003-0054348 dated Jul. 25, 2005.

* cited by examiner

*Primary Examiner*—Gabriel Chu
(74) *Attorney, Agent, or Firm*—Staas & Halsey LLP

(57) ABSTRACT

An apparatus for and method of handling a failure in reading motion picture data from a storage medium and reproducing the same includes a media-type distinguishing unit determining whether a storage medium to be reproduced is a motion picture medium; and a reading failure handling unit controlling a pick-up to shift positions on the motion picture medium and read data from a position arrived at by shifting, whenever a failure in reading the motion picture medium occurs.

30 Claims, 4 Drawing Sheets

APPARATUS FOR AND METHOD OF HANDLING FAILURE IN READING MOTION PICTURE DATA FROM STORAGE MEDIUM AND REPRODUCING THE SAME

CROSS-REFERENCE TO RELATED APPLICATION

This application claims the benefit of Korean Patent Application No. 2003-54348, filed on Aug. 6, 2003 in the Korean Intellectual Property Office, the disclosure of which is incorporated herein in its entirety by reference.

BACKGROUND OF THE INVENTION

1. Field of the Invention

The present invention relates to reproduction of motion picture media, and more particularly, to an apparatus for and method of handling a failure in reading motion picture data from a storage medium and reproducing the same, in which discontinuance in reproducing the motion picture data of the storage medium can be prevented.

2. Description of the Related Art

When a conventional apparatus for reproducing a storage medium like a disc encounters a damaged area on the disc, since the damaged area may cause a failure in reading the disc, the apparatus tries to read data from the damaged area several times. If the apparatus fails to read the damaged area, abandons reproduction of the disc.

FIG. 1 is a flowchart illustrating a method of handling a failure in reading a disc, which is performed by the conventional apparatus for reproducing the disc. In operation 100, the apparatus (not shown) for reproducing a disc reads data from the disc and transmits the data to a host device (not shown), such as a computer with a motion picture player, to reproduce and display motion picture data. When the apparatus meets a scratch on the disc, it may fail to read data around the scratch. If the apparatus fails to read data around the scratch on the disc in operation 110, the apparatus jumps a prescribed number of addresses from where the reading failure occurs and reads data at the address arrived at by jumping (operation 120).

If the apparatus again fails to read data at the address arrived at by jumping in operation 130, in the apparatus checks whether a predetermined time has been passed (time-out) in operation 140. Operations 120 through 140 are repeated until data at the address arrived at by jumping is successfully read by the apparatus or there is a time-out. Such repetition is performed at the same address arrived at by jumping first.

If data is successfully read out from the address arrived at by jumping, the apparatus transmits the data to the host device to be displayed in operation 150. If data at the address arrived at by jumping fails to be read before the time-out, the apparatus stops reproducing the disc and sends an error message to the host device in operation 160. The host device stops playing motion pictures from data of the disc when the error message is sent.

As described above, in a conventional apparatus for and method of handling a failure in reading and reproducing a disc having a non-recoverable scratch, when the apparatus fails to read data around the scratch on the disc, it jumps a prescribed number of addresses from where the reading failure occurs, and tries to read data from the address arrived at by jumping within a predetermined time. If the apparatus again fails to read data from the address arrived at by jumping within the predetermined time, it abandons reproduction of the disc.

Storage media having motion picture data need to be continuously reproduced rather than to make precise error correction. For example, when a storage medium having movie contents has a scratch thereon, a viewer would prefer the movie contents from the storage medium to be continuously displayed even though a part of the movie contents around the scratch is lost, rather than to be completely stopped. Accordingly, there is a need to distinguish storage media having motion picture data from storage media having no motion picture data and to continuously reproduce the motion picture data on the storage media.

SUMMARY OF THE INVENTION

An embodiment of the present invention provides an apparatus for and method of handling a failure in reading motion picture data from a storage medium and reproducing the same, in which, if the reading failure occurs in reproducing the storage medium, continuous reproduction of the storage medium can be performed by continuously shifting the position of the storage medium until data reading is successful.

According to an aspect of the present invention, there is provided an apparatus for handling a failure in reading a storage medium, comprising a media-type distinguishing unit for determining whether the storage medium to be reproduced is a motion picture medium; and a reading failure handling unit for controlling a pick-up to shift positions on the motion picture medium and read data from a position arrived at by shifting, whenever a failure in reading the motion picture medium occurs.

According to an aspect of the invention, the reading failure handling unit controls the pick-up to jump a prescribed number of addresses from where a first failure in reading the motion picture medium occurs and read data from an address arrived at by jumping, and then, if a second failure occurs, controls the pick-up to again jump a predetermined track length from the jumped to address and read data from a position arrived at by jumping the tracks.

According to an aspect of the invention, the predetermined track length is determined by multiplying a current reproduction speed of the storage medium and predetermined reproduction time.

According to an aspect of the invention, the predetermined track length is initially set to a predetermined value.

According to an aspect of the invention, the predetermined track length is determined by multiplying a current reproduction speed of the storage medium and predetermined time set by a user.

According to another aspect of the present invention, there is provided a method of handling a failure in reading a storage medium in an apparatus for reproducing the storage medium, the method comprising determining whether storage medium to be reproduced is a motion picture medium; and if the storage medium is the motion picture medium and a failure occurs in reading the storage medium, continuously shifting the position on the storage medium and reading data from a position arrived at by shifting whenever a failure occurs in reading the storage medium.

According to an aspect of the invention, the continuous shifting of the position of the storage medium and reading data comprises, if a first failure occurs in reading the storage medium, jumping a prescribed number of addresses from where the failure occurs and reading data from an address arrived at by jumping, if a second failure occurs in reading data at the address arrived at by the address jumping, again jumping a predetermined track length from the address and reading data from a position arrived at by the track jumping, the track length being determined by multiplying a current reproduction speed of the storage medium and predetermined time; and if a reading failure continues after the second failure, further jumping the predetermined track length from where the reading failure occurs and reading data from a position arrived at by jumping.

According to an aspect of the invention, the track length is initially set to a predetermined value.

According to an aspect of the invention, the track length is determined by multiplying a predetermined time set by a user and current reproduction speed of the storage medium.

According to still another aspect of the present invention, there is provided a system for reproducing motion pictures comprising, an apparatus for reproducing a storage medium, including a media-type distinguishing unit for determining whether the storage medium to be reproduced is a motion picture medium, and a reading failure handling unit for controlling a pick-up to shift positions on the motion picture medium and read data from a position arrived at by shifting whenever a failure in reading the motion picture medium occurs; and a host device for receiving data to be displayed from the apparatus for reproducing storage media.

According to an aspect of the invention, the reading failure handling unit controls the pick-up to jump a prescribed number of addresses from where a first failure in reading the motion picture medium occurs and read data from an address arrived at by jumping, and, if a second failure occurs, controls the pick-up to again jump a predetermined length of tracks from the jumped to address and read data from a position arrived at by jumping.

According to an aspect of the invention, the predetermined track length is determined by multiplying a current reproduction speed of the storage medium and predetermined reproduction time.

According to an aspect of the invention, the predetermined track length is initially set to a predetermined value.

According to an aspect of the invention, the predetermined track length is determined by multiplying predetermined reproduction time set by a user and a current reproduction speed of the storage medium.

According to an aspect of the invention, the host device comprises a computer system with a multimedia player.

According to yet another aspect of the present invention, there is provided a method of reproducing motion picture data of a storage medium, comprising determining whether a storage medium to be reproduced is a motion picture medium; if the storage medium is the motion picture medium, reading data to be displayed from the storage medium; if a first failure occurs in reading data from the storage medium, jumping a prescribed number of addresses from where the failure occurs and reading data at an address arrived at by jumping; if a second failure occurs in reading data at the address arrived at by jumping, again jumping a predetermined track length from the address and reading data from a track arrived at by jumping the predetermined arrived at by jumping; and if a reading failure continues to occur after the second failure, further jumping the predetermined track length from where the failure occurs and reading data from a position arrived at by jumping.

According to an aspect of the invention, the jumping of the predetermined track length from where the failure occurs and reading data from the position arrived at by jumping is performed within a predetermined time limit.

According to an aspect of the invention, the predetermined time limit is set in a host device that performs motion picture display for the data received from the apparatus for reproducing storage media.

Additional aspects and/or advantages of the invention will be set forth in part in the description which follows and, in part, will be obvious from the description, or may be learned by practice of the invention.

BRIEF DESCRIPTION OF THE DRAWINGS

The above and other aspects and/or advantages of the present invention will become more apparent and more readily appreciated by describing in detail embodiments thereof with reference to the accompanying drawings in which.

DETAILED DESCRIPTION OF THE EMBODIMENTS

Figure 1:
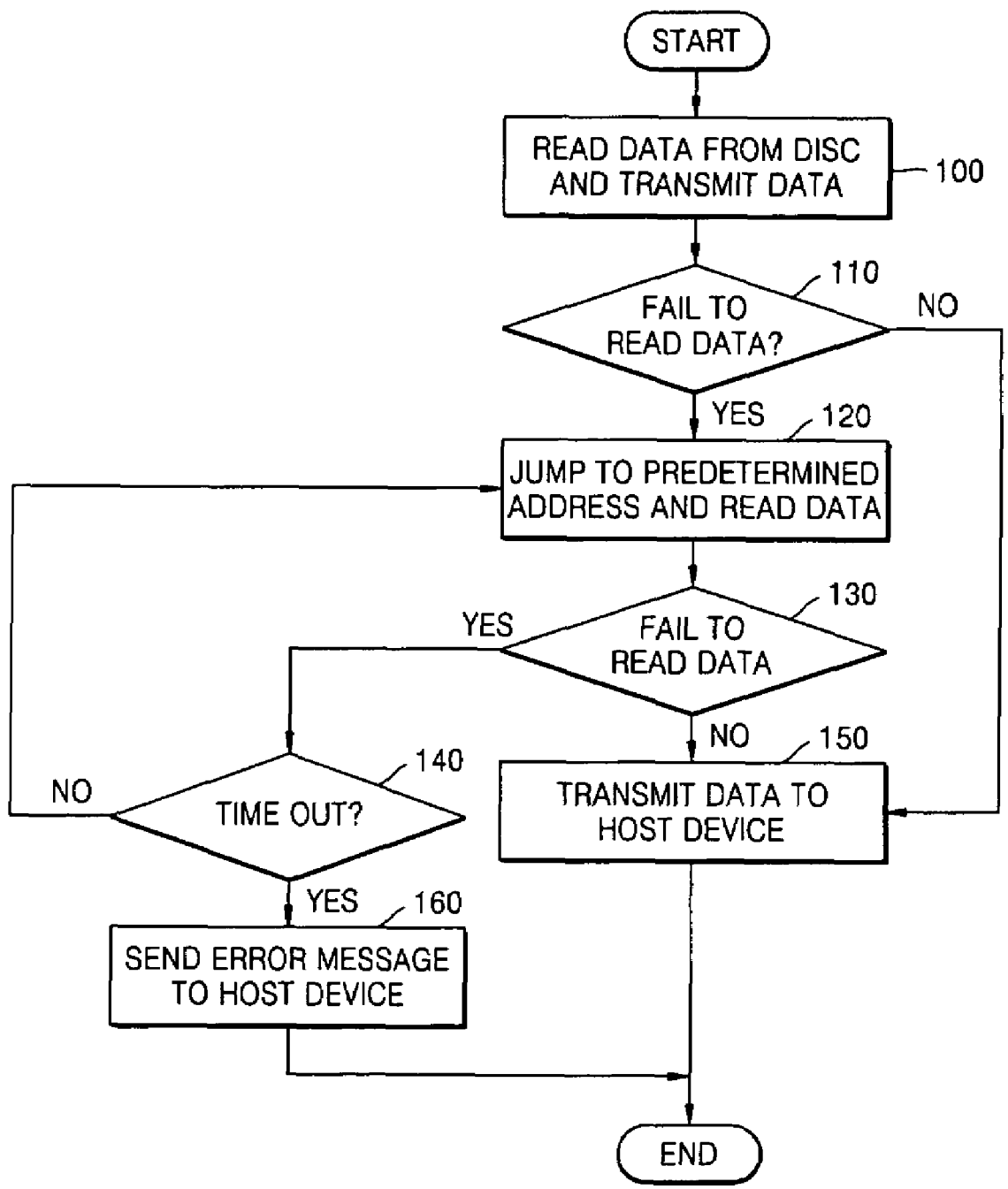
FIG. 1 is a flowchart illustrating a conventional method of handling a failure occurring while reading a disc.

The present invention now will be described more fully with reference to the attached drawings, in which exemplary embodiments of the invention are shown, wherein like reference numerals refer to the like elements throughout. This invention may, however, be embodied in many different forms and should not be construed as being limited to the embodiments set forth herein. Instead, these embodiments are provided so that this disclosure and figures will be thorough and complete, and will fully convey the concept of the invention to those skilled in the art.

Figure 2:
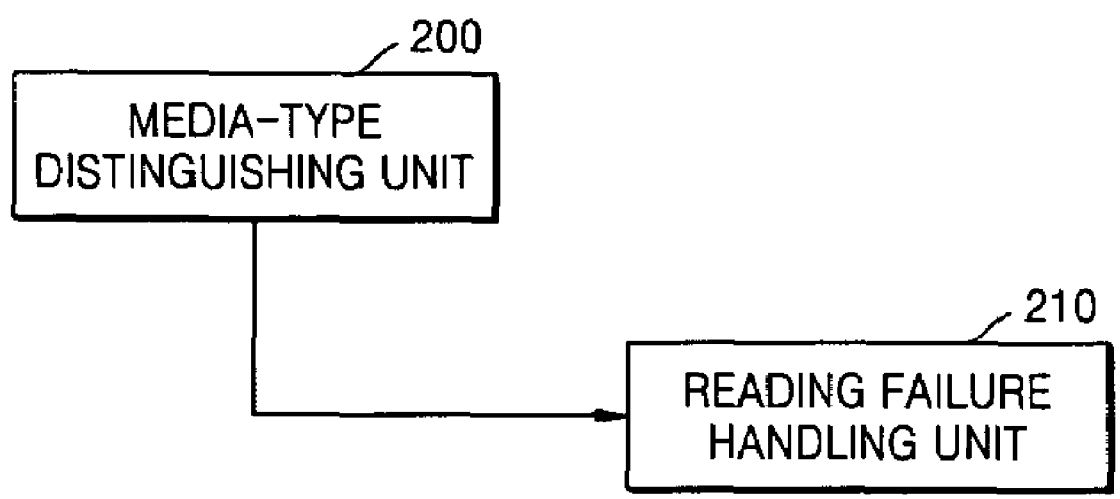
FIG. 2 is a schematic block diagram of an apparatus for handling a failure occurring while reading a storage medium having motion picture data, according to an embodiment of the present invention.

FIG. 2 is a schematic block diagram of an apparatus for handling a failure in reading a storage medium having motion picture data, according to an aspect of the present invention. The apparatus includes a media-type distinguishing unit 200 and a reading failure handling unit 210. The media-type distinguishing unit 200 determines whether a storage medium to be reproduced is a motion picture medium having motion picture data. The reading failure handling unit 210 receives a result of determining the storage medium from the media-type distinguishing unit 200.

If the storage medium is the motion picture medium and a first failure occurs in reading the storage medium, the reading failure handling unit 210 controls a pick-up (such as that included in a recording/reading unit 1001 of FIG. 4) to jump a prescribed number of addresses from where the failure occurs and read data from the address arrived at by jumping. If a second failure occurs in reading data at the address, the reading failure handling unit 210 controls the pick-up to jump a predetermined length of tracks from the address and read data from the position arrived at by jumping the tracks. Then, whenever subsequent failures occur in reading the storage medium, the reading failure handling unit 210 repeats controlling the pick-up to jump the predetermined length of tracks from where the failure occurs and read data from each position arrived at by the track jumping within a predetermined time limit. The predetermined length of tracks the pick-up jumps over is initially set to a fixed value according to an aspect of the invention. However, it is understood that the number of tracks can be determined by multiplying a current reproduction speed of the storage medium and a predetermined reproduction time according to an aspect of the invention. The predetermined reproduction time is set in advance and or be set by a user according to aspects of the invention.

Accordingly, the apparatus for handling the failure in reading the storage medium having motion picture data improves a possibility of continuously reproducing motion picture data of the storage medium without discontinuance. That is, because the apparatus jumps a comparatively wide range of a unit of tracks on the storage medium when a failure occurs in reading the storage medium, it may jump the scratch that might causes the failure faster than ever. Further, after the jump, even if the failure again continues, since the apparatus keeps performing such jumps to a different place on the storage medium and reads data from the different place until the failure stops occurring, the storage medium can be continuously reproduced during at least a predetermined time limit that may be set by the user.

The apparatus described above with reference to FIG. 2 can be incorporated into a conventional apparatus for reproducing a storage medium such as a CD, DVD, Bluray Disc, Advanced Optical Disc, etc. The apparatus of FIG. 2 transmits data to a host device (not shown) such as a computer with a multimedia player for displaying motion pictures and having the apparatus shown in FIG. 2. While described in terms of a computer, it is understood that other multimedia players can be used, such as portable players such as portable CD or DVD players or in stand alone players.

It will be understood that only specific components were illustrated and described, but that other components that are commonly used in conventional apparatuses for reproducing storage media may also be included in the apparatus according to the present invention.

Figure 3:
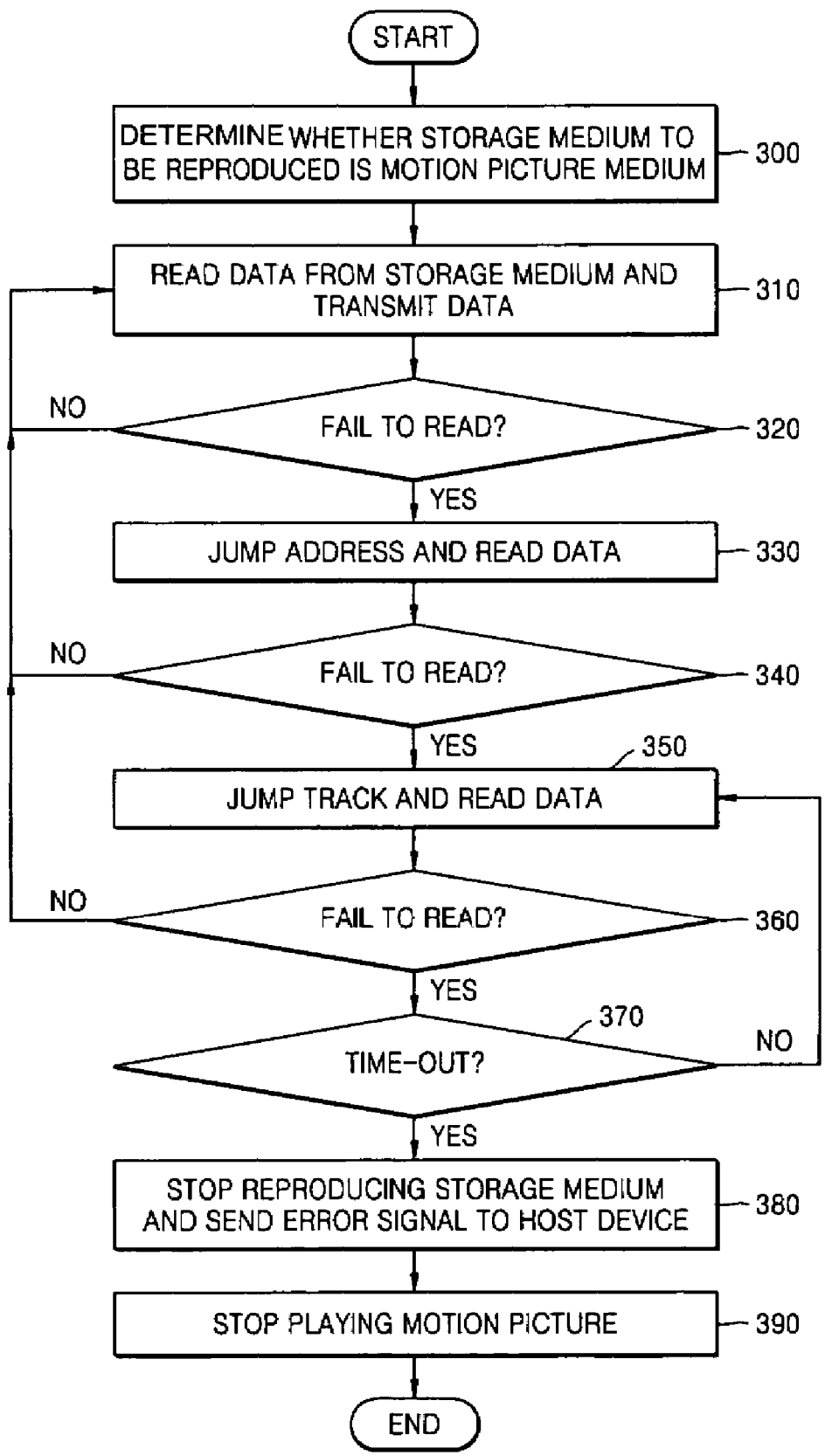
FIG. 3 is a flowchart illustrating a method of handling a failure occurring while reading a storage medium having motion picture data, according to an embodiment the present invention.

FIG. 3 is a flowchart illustrating a method of handling a failure in reading a storage medium having motion picture data, according to the present invention, used in the apparatus of FIG. 2. While not required in all aspects, is understood that the method shown in FIG. 3 can be implemented using, at least in part, computer software encoded on one or more computer readable medium for use by a general or special purpose computer.

First, the apparatus of FIG. 2 determines whether the storage medium to be reproduced is a motion picture media in operation 300. The apparatus for reproducing the storage medium, such as a disc drive, reads data from the storage medium and transmits data to a host device like a computer with multimedia player in operation 310. The host device displays data received from the apparatus by using software for a playing motion picture.

When the apparatus fails to read data from the storage medium in operation 320, the apparatus jumps prescribed number of addresses from where the failure occurs and tries to read data from the address arrived at by jumping in operation 330.

If the apparatus fails again to read data from the address in operation 340, the apparatus jumps a predetermined length of tracks from the address and tries to read data from the position arrived at by jumping in operation 350. If the apparatus fails again in operation 360, the apparatus checks if a predetermined time limit has passed (time out) in operation 370, and if not, the apparatus performs operations 350 through 370 again. The predetermined length of tracks that the apparatus jumps over is determined by multiplying a current reproduction speed of the storage medium and a predetermined reproduction time, or is initially set to a fixed value according to the aspects of the invention. The predetermined reproduction time may be given by a user according to the aspects of the invention.

If the failure continues in reading the storage medium after the time out, the apparatus stops reading and reproducing the storage medium and transmits an error signal to the host device in operation 380. Upon receiving the error signal from the apparatus, the host device stops playing a motion picture of the storage medium in operation 390.

As described above, the apparatus for reproducing a storage medium according to the present invention can continuously reproduce the storage medium having motion picture data. That is, the apparatus according to the present invention jumps predetermined length of tracks on which any defects or scratches may exist, which causes a reading failure, if the apparatus fails to read out data from the storage medium. The apparatus performs continuous track jumping until data is read out from the storage medium or a predetermined time has passed. Therefore, as compared to the conventional apparatus for and method of handling a failure in reading the storage medium and reproducing the same, the apparatus and method according to the present invention may prevent a complete halt of reproduction of the storage medium by continuously reproducing the storage medium in spite of the loss of parts of data of the storage medium.

While described in terms of a motion picture data by way of example, it is understood the present invention can be used with other forms of media, such as audio data, and for other forms of data.

Accordingly, the apparatus for and method of handling a failure in reading the storage medium having motion picture data and reproducing the same can allow the user to view the continuous play of motion pictures of the storage medium.

Figure 4:
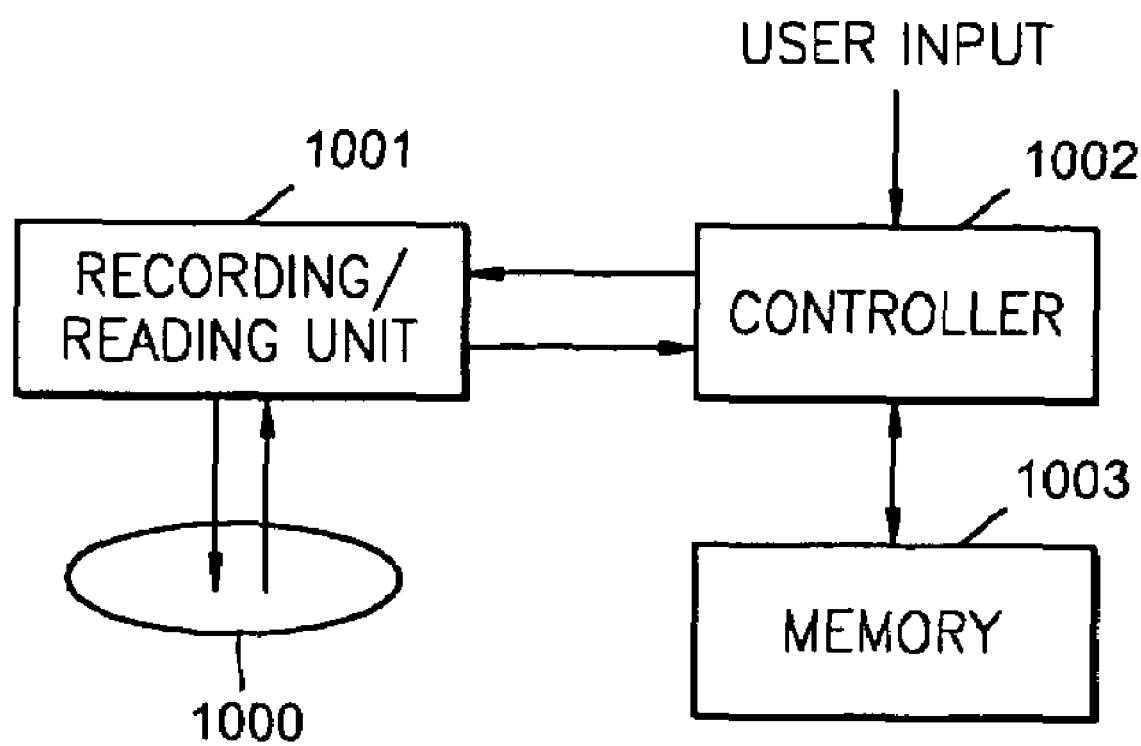
FIG. 4 is a block diagram of a recording and/or reproducing apparatus according to an embodiment of the present invention.

FIG. 4 is a block diagram of a recording apparatus according to an embodiment of the present invention. Referring to FIG. 4, the recording apparatus includes a recording/reading unit 1001, a controller 1002 including the media-type distinguishing unit 200 and the reading failure handling unit 210, and a memory 1003. The recording/reading unit 1001 transfers data with respect to a disc 1000 according to the aspects of the present invention shown in FIGS. 2 and 3. While not required in all aspects, it is understood that the controller 1002 can be a computer implementing the method of FIG. 3 using a computer program encoded on a computer readable medium. The computer can be implemented as a chip having firmware, or can be a general or special purpose computer programmable to perform the method.

While this invention has been particularly shown and described with reference to embodiments thereof, it will be understood by those skilled in the art that various changes in form and details may be made therein without departing from the spirit and scope of the invention as defined by the appended claims and equivalents thereof.

What is claimed is:

1. An apparatus for handling a failure in reading a storage medium, comprising:

a media-type distinguishing unit determining whether the storage medium to be reproduced is a motion picture medium; and a reading failure handling unit controlling a pick-up to shift positions on the storage medium if the storage medium is determined to be the motion picture medium and to read data from a position arrived at by shifting when a failure in reading the motion picture medium occurs, wherein the reading failure handling unit controls the pick-up to jump a predetermined number of addresses from where a first failure in reading the motion picture medium occurs and reads data from an address arrived at by jumping, and then, if a second failure occurs, controls the pick-up to jump a predetermined track length from the address and read data from a position arrived at by jumping the tracks, and wherein the predetermined track length is determined by multiplying a current reproduction speed of the storage medium and a predetermined reproduction time.

2. The apparatus of claim 1, wherein the predetermined reproduction time is set by a user.

3. The apparatus of claim 1, wherein the predetermined track length is initially set to a predetermined value.

4. The apparatus of claim 1, wherein the predetermined track length is determined by multiplying a current reproduction speed of the storage medium and a predetermined time set by a user.

5. A method of handling a failure in reading a storage medium in an apparatus for reproducing the storage medium, the method comprising:

determining whether the storage medium to be reproduced is a motion picture medium; and if the storage medium is determined to be a motion picture medium and a failure occurs in reading the storage medium, continuously shifting a read position on the storage medium and reading data from a shifted to position arrived at by shifting when the failure occurs at the initial read position during reading the storage medium, wherein the continuous shifting of the position of the storage medium and reading data comprises:

if a first failure occurs in reading the storage medium, jumping a predetermined number of addresses from where the failure occurs and reading data from an address arrived at by jumping;

if a second failure occurs in reading data at the address arrived at by the address jumping, jumping a predetermined track length from the arrived at address and reading data from another position arrived at by the track jumping, the track length being determined by multiplying a current reproduction speed of the storage medium and a predetermined time; and if a reading failure continues after the second failure, further jumping the predetermined track length from the another position where the reading failure occurs and reading data from a further position arrived at by the jumping.

6. The method of claim 5, wherein the predetermined time is set by a user.

7. The method of claim 5, wherein the track length is initially set to a predetermined value.

8. A system for reproducing motion pictures comprising:

an apparatus for reproducing a storage medium, including a media-type distinguishing unit determining whether a storage medium to be reproduced is a motion picture medium, and a reading failure handling unit controlling a pick-up to shift positions on the storage medium if the storage medium is determined to be the motion picture medium and to read data from a position arrived at by shifting when a failure in reading the motion picture medium occurs; and a host device for receiving data to be displayed from the apparatus for reproducing storage media, wherein the reading failure handling unit controls the pick-up to jump a predetermined number of addresses from where a first failure in reading the motion picture medium occurs and to read data from an address arrived at by jumping, and, if a second failure occurs, controls the pick-up to again jump a predetermined length of tracks from the address and read data from another position arrived at by again jumping, and wherein the predetermined length of tracks is determined by multiplying a current reproduction speed of the storage medium and a predetermined reproduction time.

9. The system of claim 8, wherein the predetermined reproduction time is set by a user.

10. The system of claim 8, wherein the host device comprises a computer system with a multimedia player including the apparatus.

11. The system of claim 8, wherein the predetermined length of tracks is determined by multiplying a current reproduction speed of the storage medium and a predetermined reproduction time.

12. The system of claim 8, wherein the predetermined length of tracks is initially set to a predetermined value.

13. The system of claim 8, wherein the predetermined length of tracks is determined by multiplying a predetermined reproduction time set by a user and a current reproduction speed of the storage medium.

14. A method of reproducing motion picture data of a storage medium, comprising:

determining whether a storage medium to be reproduced is a motion picture medium;

if the storage medium is determined to be the motion picture medium, reading data to be displayed from the storage medium;

if a first failure occurs in reading data from the storage medium, jumping a prescribed number of addresses from where the failure occurs and reading data at an address arrived at by jumping;

if a second failure occurs in reading data at the address arrived at by jumping, jumping a predetermined track length from the address and reading data from a track arrived at by jumping the predetermined track length; and if a reading failure continues to occur after the second failure, further jumping the predetermined track length from the arrived at track where the failure occurs and reading data from a position arrived at by jumping, wherein the predetermined track length is determined by multiplying a current reproduction speed of the storage medium and a predetermined reproduction time.

15. The method of claim 14, wherein jumping the predetermined track length from where the second failure occurs and reading data from the position arrived at by jumping is performed within a predetermined time limit.

16. The method of claim 15, wherein the predetermined time limit is set in a host device that performs motion picture display for the data received from an apparatus for reproducing storage media.

17. An apparatus for handling a failure in reading a storage medium, comprising:

a pickup to transfer data with respect to a track on the storage medium; and a reading failure handling unit controlling the pickup to, in response to a first failure in reading data from the storage medium, shift a position of the pickup on the storage medium from a first position to a second position, and in response to a second failure in reading the data at the second position, again shift the pickup on the storage medium from the second position to another position, wherein the shift after the second failure is a predetermined track length from an address and read data from a position arrived at by jumping the tracks, the predetermined track length being determined by multiplying a current reproduction speed of the storage medium and a predetermined reproduction time.

18. The apparatus of claim 17, further comprising a data type detector which detects a type of the data being transferred with respect to the pickup, wherein the reading failure handling unit controls the pickup in accordance with the detected data type.

19. The apparatus of claim 18, wherein the data type detector detects if the data includes video data, wherein the reading failure handling unit controls the pickup if the detected data includes the video data, and does not control the pickup if the data does not include the video data.

20. The apparatus of claim 19, wherein the data type detector detects if the data includes motion picture data including the video data, wherein the reading failure handling unit controls the pickup if the detected data includes the motion picture data, and does not control the pickup if the data does not include the motion picture data.

21. The apparatus of claim 18, wherein the data type detector detects if the data includes audio data, wherein the reading failure handling unit controls the pickup if the detected data includes the audio data, and does not control the pickup if the data does not include the audio data.

22. The apparatus of claim 18, wherein the reading failure handling unit controls the pickup if the detected data includes a first type of data, and does not control the pickup if the data does not include the first type of data.

23. The apparatus of claim 17, wherein, when the first failure is detected, the reading failure handling unit jumps from an address having the first position to another address having the second position.

24. A data transfer device for recording and/or reproducing data with respect to the storage medium using the apparatus of claim 17.

25. A method of reproducing data of a storage medium, comprising:

if a first failure occurs in an attempt to read the data from a first position of the storage medium, jumping to a second position; and if a second failure occurs in an attempt to read the data at the second position, again jumping to another position and attempting to read the data from the another position, wherein the jumping comprises jumping a predetermined number of tracks from the first position and/or the again jumping comprises jumping a predetermined number of tracks from the second position, and wherein the predetermined number of tracks is determined by multiplying a current reproduction speed of the storage medium and a predetermined reproduction time.

26. The method of claim 25, further comprising transferring data read prior to the first failure and data read from the another position to a host device for reproduction.

27. The method of claim 26, wherein the host device is a multimedia player that displays the read data during the reproduction.

28. The method of claim 25, further comprising detecting a type of data to be reproduced from the storage medium, wherein, if the type of data is not a predetermined type, not performing the again jumping.

29. The method of claim 28, wherein the predetermined type comprises video and/or audio data.

30. A computer readable medium encoded with processing instructions for implementing the reproduction method of claim 25 performed by a computer.

* * * * *